Patented Oct. 31, 1950

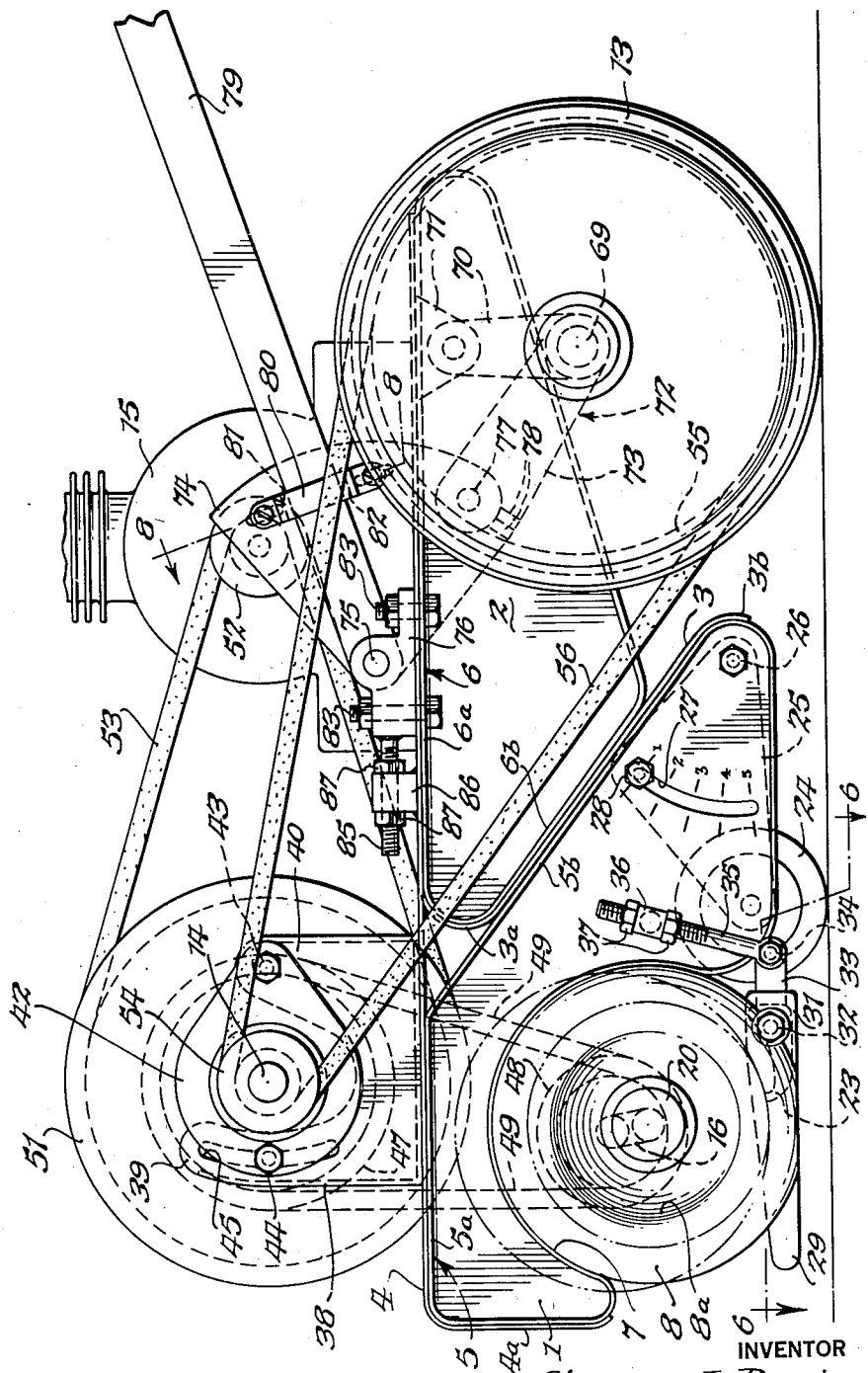

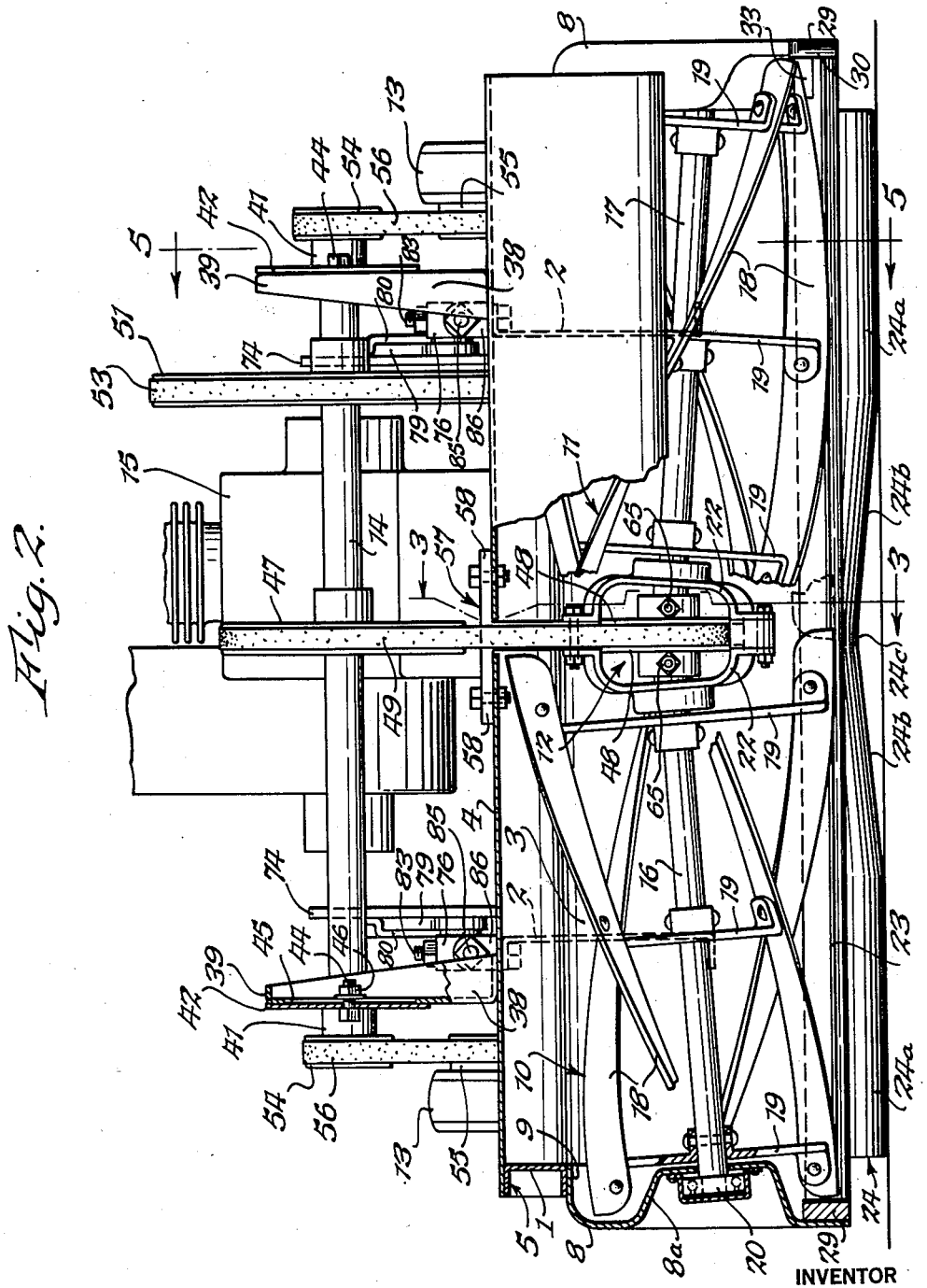

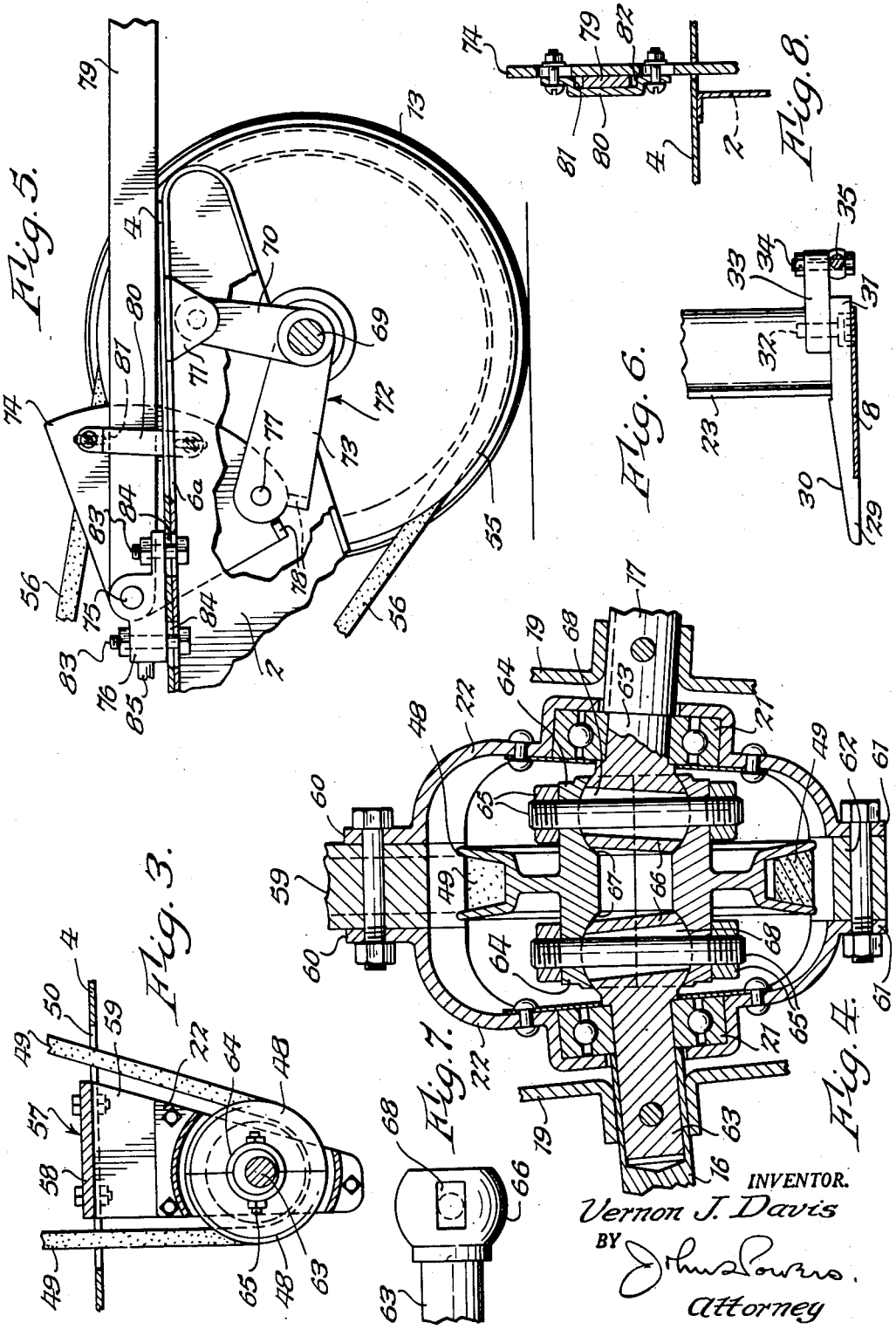

2,528,041

UNITED STATES PATENT OFFICE 2,528,041

LAWN MOWER

Vernon J. Davis, Buffalo, N. Y.

Application December 22, 1945, Serial No. 636,817

2 Claims. (Cl. 56—26)

This invention relates to improvements in lawn mowers of the general type wherein two cutting reels are arranged in tandem relation.

The objects are to provide such a lawn mower in which the number of blades of each cutting reel is not limited by characteristics of the driving elements of the reels, thereby enabling substantially increased operating efficiency, either by an increase in the number of blades or by greater rotative speed of the reels with a decreased number of blades, while maintaining the advantage of an extremely wide continuous swath along a horizontal line; and in which provisions are made for a simple and compact driving mechanism available for cooperation with a power drive; for the utilization of the handle, in addition to the usual guiding operation, for the control of the connection or disconnection of power to the driving wheels, for the location of the driving wheels whereby they will operate within the cut area and beyond the zone or strip along which the cut grass is deposited; and for the efficient cutting of extremely high grass.

For the attainment of the above objects the invention, generally speaking, embodies a lawn mower in which the cutting reels are of frustoconical outline and are mounted on shafts which are relatively inclined downward from their adjacent ends at an angle such that the blades of each reel will generate a horizontal cutting line, the cutting lines of the reel being co-planar continuous, straight and normal to the direction of movement of the mower, and spaces are provided between the adjacent ends of the shafts for a common driving element and its operative connections to the shafts and between the adjacent ends of the blades of the reels in upper positions thereof for the connection of the driving element to a driving shaft; in which the reels deflect the cut grass to a strip or zone located centrally of the cut area; in which the traction wheels are located to run within the cut area and beyond the aforesaid central strip or zone; in which, a power drive being considered, the traction wheels are under the control of the handle in a manner such that their rotation may be initiated and continued or stopped at will; and in which provision is made for an adjustment of the spacing between the line of shear and the ground through a range many times in excess of the range of such adjustment heretofore possible.

In the accompanying drawings:

Figure 1 is a side elevation of a lawn mower embodying my invention.

Figure 2 is a front elevation thereof, partly in section.

Figure 3 is a detail longitudinal section on the line 3—3 of Figure 2.

Figure 4 is a cross section of the driving mechanism for the reel shafts.

Figure 5 is a detail longitudinal section on the line 5—5 of Figure 2.

Figure 6 is a detail horizontal section on the line 6—6 of Figure 1.

Figure 7 is a detail plan view of the ball element at the inner end of the shaft of one of the cutting reels, this construction being duplicated for the shaft of the adjoining cutting reel.

Figure 8 is a detail cross section on the line 8—8 of Figure 1.

The various working parts are supported in operative relation by a frame which comprises a pair of similar front side walls 1, a pair of similar rear side walls 2 and an apron 3 and a platform 4 connecting both pairs of side walls. The side walls 1 and 2 are of channel cross section and are provided with continuous circumscribing flanges 5 and 6 respectively. These flanges are co-planar in the horizontal parts of their upper courses. The side walls 1 are so shaped that the lower courses of their flanges 5 provide in their forward portions recesses 7 of semi-circular outline. Circular bearing plates 8 are arranged in the recesses 7 and have along their upper edges flanges 9 which conform in extent and curvature to said recesses and are welded to the flanges 5. Each wall 1 is also so shaped that the upper course of its flange 5 has a straight front portion 5a and a downwardly and rearwardly inclined rear portion 5b. The side walls 2 are in planes located suitably inward laterally of the planes of the side walls 1 (see Figure 2). Each flange 6 has a straight upper course 6a which is co-planar with the portions 5a of the flanges 5 and a lower course which includes a downwardly and rearwardly inclined portion 6b adjacent and conforming in inclination to the portions 5b of the flanges 5.

The apron 3 is welded to the flange portions 5b and 6b and provides a connection between the side walls 1 and 2 to hold them in properly laterally and longitudinally spaced relation. The upper portion of the apron 3 is curved as at 3a to conform to the curved portions at the front of the flanges 6 to which it is attached by welding. The lower portion of the apron 3 is curved as at 3b to conform to the curved portion at the rear ends of the flanges 5 to which it is attached by welding.

The platform 4 is welded to the flange portions 5a and 6a and, like the apron 3, provides a connection between the side walls 1 and 2 to hold them in properly laterally and longitudinally spaced relation. The platform 4 as connected to the flange portions 5a and 6a conforms in width to the spacing of the side walls 1 and 2, respectively. At its front end the platform 4 has a downwardly projecting extension 4a which is welded to the front portions of the flanges 5.

The principal operating parts are the reels 10 and 11, the common driving mechanism 12 for the reels, the traction wheels 13, the jackshaft 14 and the motor 15.

The reels 10 and 11 are arranged in tandem and are carried by shafts 16 and 17 respectively. The reels are similar in construction and their blades 18 are each inclined laterally from end to end in the usual manner. The reels are of frusto-conical outline with their wider ends adjacent and their narrower ends remote. Their axes with which, of course, the shafts 16 and 17 are coincident, are inclined relatively downward at the same angle to the perpendicular. The blades of each reel are carried by spiders 19 secured to the shafts 16 and 17 and are staggered or offset relatively to the blades of the other.

The mutual relation of the inclination of the shafts 16 and 17 and the frusto-conical outline of the reels is such that the blades of the respective reels in their lowermost positions have their adjacent ends in overlapping relation (see Figure 2) and cut a continuous straight and uniform swath and in their upper positions are substantially spaced, thereby to provide a clearance 10a which is utilized for the accommodation of the belt 49 to be hereinafter described.

The shafts 16 and 17 are mounted in ball bearings 20 and 21. The bearings 20 are carried by the plates 8 and are arranged within central dished portions 8a of said plates and the bearings 21 are carried by brackets 22 arranged, respectively, at opposite sides of the driving mechanism 12.

The blades 18 cooperate in the usual manner with a fixed transverse shear blade 23. The lateral inclination of the blades of the respective reels is in opposite directions and is such that the cut grass is thrown inwardly along a central zone or strip. The front or reel carrying portion of the mower is supported from the ground by a transverse pony-roll 24 which includes cylindrical ground-engaging surfaces 24a and adjoining tapered surfaces 24b, these providing a relatively wide recess 24c which is of such depth and width as to afford suitable clearance for the cut grass deposited along the central zone or strip.

The pony-roll is provided with end journals which are mounted in supporting plates 25 (see Figure 1) pivoted at their rear ends, as at 26, to the frame side walls 1. The pivotal mounting of the plates 25 provides for the adjustment of the elevation of the pony-roll relatively to the frame side walls 1 whereby the spacing of the reel blades from the ground may be suitably varied as conditions may require. For the purpose of such adjustment the walls 1 are formed with curved slots 27 and the plates 25 are provided with studs which project through these slots and carry nuts 28 which may be tightened against the side walls 1 and by means of which the plates 25 may be held secure in any position to which they may be adjusted about their pivots 26. By lowering the plates 25 relatively to the frame side walls 1 the spacing of the reels from the ground is increased. As shown in Figure 1 the side walls 1 are provided with inch calibrations to indicate the spacing of the reels from the ground in any particular adjustment of the blades 25. Figure 1 shows the plates 25 in an extreme position wherein the reels have minimum (that is to say one inch) spacing from the ground.

It will be noted that the pony-roll 24 is mounted directly behind the reels and as close to them as possible. When, by the adjustment of the plates 25 as above described, the pony-roll is raised or lowered relatively to the side frame walls 1 the entire frame of the mower swings about the points of contact of the traction wheels with the ground as fulcra. By virtue of the features described the distance between the fulcra points and the pony-roll is such that a much greater degree of adjustment of the spacing of the line of shear from the ground is provided for than has heretofore been possible. Thus, as the drawings assume, the spacing of the line of shear from the ground may be varied within a range of five inches which is many times in excess of the maximum range of adjustment heretofore possible. This characteristic enables the efficient use of the mower for cutting high grass, for example, grass up to 7½" high (the range of adjustment plus the minimum radius of the reel). Such grass may be cut relatively close by two operations or passes of the mower, the pony-roll being raised relatively to the front side walls 1 between these operations in order appropriately to reduce the spacing of the line of shear from the ground.

For the purpose of enabling the grass to be cut close to a wall, fence or like projecting fingers 29 are provided (see Figures 1 and 6) at each side of the mower. These fingers project forwardly from the cutting line of the reels and each have their inner sides formed as a forwardly tapering active surface 30, the front edges of the fingers being relatively narrow or bladelike. The surfaces 30 act as plows on the grass which is beyond the outer ends of the reels and deflect such grass into the cutting zone. The fingers 29 are provided back of the active surfaces 30 with shanks 31, the outer faces of which are recessed to take over the lower portions of the plates 8 whereby such lower portions will be flush with the outer surfaces of the fingers 29. The shanks 31 are welded to the lower portions of the plates 8. The inner faces of the shanks 31 are recessed to take over the ends of the fixed shear blade 23. The shear blade is supported by and between the shanks 31 by means of trunnion screws 32, the heads of which are fitted in recesses in the shanks 31 and the stems of which are threaded into recesses in the ends of the shear blade. Thereby the shear blade may be rockably adjusted about the stems of the trunnion screws 32 in order that the spacing of the cutting edge of the shear blade from the cutting edges of the blades of the reels may be suitably regulated. For the purpose of such adjustment the shear blade is provided at its ends with rearwardly projecting arms 33. These arms are connected at their rear ends by pivot screws 34 to the eyes of bolts 35 which extend through brackets 36 swivelly connected to the frame side walls 1. The threaded portions of the bolts carry adjusting nuts 37 which are located above and below the brackets 36. By the adjustment of these nuts in the obvious manner the bolts 35 are caused to alter the angle of the shear blade 23 about its pivotal axis, thereby to bring the cutting edge of the shear blade closer to or further from the cutting edges of the blades of the reels, accordingly as circumstances may require.

The transverse jackshaft 14 is supported from and above the platform 4 by brackets 38 which are each provided with upright arms 39 and 40 (see Figure 1) between which the shaft extends. The jackshaft is mounted in bearings 41 carried by plates 42, each having an opening through which the jackshaft extends. The plates 42 are pivoted as at 43 to the arms 40 and at diametrically opposite points are provided with bolts 44 which project through curved slots 45 in the arms 39 and carry nuts 46 (see Figure 2) by means of which the plates 42 may be secured in any desired position along the extent of the slots 45.

The jackshaft carries a centrally located sheave 47 and the driving mechanism 12 for the cutting reels includes a sheave 48 in the same vertical plane as the sheave 47. The jackshaft 14 is located above the sheave 48 substantially in a vertical plane common to the axes of the sheave and the jackshaft. It will be obvious that the common plane may be inclined slightly to the perpendicular (Figure 1 of the drawings being considered) in either direction. Thus, as shown in the drawing, the common plane of the axes of the sheave 48 and the jackshaft 14 is inclined at an angle to the right (Figure 1 of the drawings being considered) of the order of 7° to the perpendicular. The expression "substantially in a vertical plane" therefore connotes any inclination to the perpendicular of the common plane of the axes of the sheave and the jackshaft in either direction at a relatively slight degree, i. e. a degree compatible with the purposes of the invention and the accomplishments of its results. The sheaves 47 and 48 are operatively connected by a belt 49 which passes through an opening 50 (see Figure 3) in the platform 4, the sheave 48 being thereby driven from the sheave 47. The belt 49 also passes through the clearance 10a between the substantially spaced blades of the respective reels in the upper range of their revolutions. The purpose of the provisions of the jackshaft supporting plates 42 and their pivotal mounting 43 is to provide for the tensioning of the belt 49 as occasion may require, either for the substitution of sheaves of different diameters or for taking up slack resulting from continued use and wear. The tensioning of the belt 49 is accomplished by backing off the nuts 46 and raising the plates 42 about their pivots until the belt has the desired tension whereupon the nuts 46 are tightened against the surfaces of the arms 39 to hold the plates 42 in the positions to which they have been adjusted. Clearance for the belt 49 relatively to the reels is provided for by the spacing of the adjacent ends of the cutting blades in the upper positions thereof.

The jackshaft 14 carries near one end a sheave 51 which is in the same vertical plane as a sheave 52 on the shaft of the motor 15, these sheaves being connected by a belt 53 whereby the jackshaft is driven from the shaft of the motor. The motor is supported upon the platform 4 and its base is mounted upon said platform for fore and aft adjustment by any appropriate conventional or well-known means (not shown) whereby the motor may readily be positioned and secured to maintain the belt 53 under proper tension.

The jackshaft is provided at its ends with sheaves 54 which are in the same vertical planes as sheaves 55 carried by the traction wheels 13 at their inner sides. The sheaves 54 and 55 of each co-planar pair are connected by a belt 56 whereby the traction wheels are driven from the jackshaft.

The driving mechanism 12 is supported from the platform 4. Its supporting elements consist of the brackets 22 aforesaid and a hanger 57 T-shaped in cross section and comprising a base 58 which is mounted upon and secured to the platform 4 and a central web 59 which projects through the opening 50. The brackets 22 are secured to the web 59 (see Figure 4) at its opposite sides and near its lower end, for this purpose being formed at their upper ends with attachment lugs 60, and are provided at their lower ends with lugs 61 which are connected by bolt fastenings. The lugs 60 and 61 are preferably co-planar and a spacing block 62, co-planar with the web 59 of the hanger 57, is fitted between the lugs 61.

For manufacturing convenience the shafts 16 and 17 have functional extensions 63, the shanks of which are fitted in sockets at the inner ends of the shafts and are directly journalled in the bearings 21, the extensions 63 being rigidly connected to the shafts by the pins which secure the innermost spiders 19.

The sheave 48 of the driving mechanism 12 is made in matching half-sections, each of semi-circular form (see Figure 3), and is provided at each side with hub extensions 64 which, in opposing pairs, are connected by bolt and nut fastenings 65, the half-sections of the sheave thereby being secured in assembled relation.

The driving connections between the sheave 48 and the shafts 16 and 17 are such as to compensate for the variation of the angles of the axes of these shafts to the perpendicular and, accordingly, have some of the attributes of universal joints. Thus the shaft extensions 63 are formed at their inner ends with ball elements 66 and the hub extensions 64 are formed internally to provide conforming socket elements 67, the ball elements being secured in the socket elements by the bolts of the fastenings 65 and being formed between their upper and lower sides (Figure 4 of the drawing being considered) with slots 68. The ball and socket elements are operatively connected by pins which extend through the slots 68 and the bolt elements of the fastenings 65 are utilized to provide such pins. The slots 68 conform in width to the pins but have suitably greater length (see Figures 4 and 7) than the pin diameters to compensate for the divergence of the axes of the shafts 16 and 17 from an angle normal to the perpendicular. Thereby, despite such divergence, the shafts are driven positively, and without loose play, from the sheave 48.

The traction wheels 13 are mounted upon an axle 69 which is hung by links 70, each located at the outer sides of the adjacent rear frame side wall 2 and pivoted to a bracket 71 which is secured to the flange portion 6a of said side wall. The object of the support of the shaft 69 by the links 70 is to enable its movement in fore and aft directions relatively to the supporting frame in order that the belt 56 by which the wheels 13 are driven from the jackshaft 14 may be under normal working tension, as shown in Figure 1, or may be sufficiently slack, as shown in Figure 5, whereby the wheels 13 will not be driven from the jackshaft. By thus varying the positions of the wheels 13 relatively to the supporting frame the movement of the mower along the lawn may, at will, be initiated, continued or stopped.

For the purpose of effecting such fore and aft movement of the traction wheels relatively to the supporting frame the axle 69 is connected to the supporting frame by toggle links 72, the parts of which are located inwardly of, that is to say between, the frame side walls 2. These parts are in each instance a link element 73 pivotally mounted upon the axle 69, a companion link element 74 pivoted as at 75 to a bracket 76 mounted upon and secured to the platform 4 and a pivotal connection 77 between the elements 73 and 74. In order that the pivots 69, 75 and 77 may be held in a normal relation of dead center the companion link elements 73 and 74 are provided at their adjoining ends with shoulders 78 by the engagement of which, as shown in Figure 1, the relative extension movements of the elements 73 and 74 are limited.

The toggle links 72 are extended or collapsed by means of handle arms 79 which at their upper ends carry an appropriate hand grip (not shown). The arms 79 at their lower ends are mounted upon the pivot pins 75. Each link element 74 has a rigid actuating arm which projects upward and rearward from the pivot 75, the link element and its associated arm being of functional bell crank relation. For convenience of manufacture the link element 74 and its associated arm are combined in the form of a quadrant which carries a strap 80 through which a handle arm 79 extends. By the movement of the handle arms 79 about the pivot pins 75 the quadrants 74 are moved to extend or break the toggle links 72, the platform 4 having openings (not shown) through which the quadrants project. When the toggle links are extended, as shown in Figure 1, the handle arms 79 are supported from the link elements 74 at an appropriate angle of inclination. The straps 80 are mounted for adjustment along chords of the link elements (quadrants) 74 whereby the normal working elevation of the arms 79 (see Figure 1) may be varied to meet the convenience of individuals of different heights. The straps 80 are formed with upper and lower shoulders 81 and 82 between which the arms 79 extend and which are, respectively, engaged by the arms as moved about the pivots 75 to initiate or discontinue the movement of the mower along the ground. The spacing of the shoulders 81 and 82 is suitably greater than the vertical thickness of the arms 79 (see Figure 8) whereby the vibrations of the mower incident to its movement over the ground will not be transmitted by the arms 79 to the hands of the operator.

When the toggle links 72 are extended, as shown in Figure 1, their elements are in self-locking relation and the shoulders 82 will take the weight of the arms 79. At such time the belts 56 will be under normal working tension and when the motor 15 is put in operation the mower will move along the surface of the ground. When it is desired to stop the movement of the mower without, however, stopping the operation of the motor, the arms 79 are moved downward by pressure upon the handle at their upper ends and, acting on the shoulders 82, will effect the relative collapsing movements of the toggle link elements and thereby cause the links 70 to swing in a forward direction about their supporting pivots, thus shifting the traction wheels and the sheaves 55 forwardly relatively to the supporting frame (see Figure 5). As a result, the working tension of the belts 56 is relieved whereby the belts will slip upon the sheaves 55 and the traction wheels will not be driven from the jackshaft 12, the movement of the mower along the ground thus being discontinued. When it is desired to again initiate the movement of the mower along the ground the arms 79 are lifted from the position of Figure 5 and, by engagement with the shoulders 81, will raise the link elements 74 and thereby cause the relative extension movements of the toggle link elements with the result that the axle 69, carrying with it the traction wheels 13 and the sheaves 55, will be shifted in the rearward direction until the toggle links 72 are fully extended. At such time the normal working tension of the belts 56 will be restored and the traction wheels will be driven from the jackshaft, the movement of the mower along the ground thus being resumed.

The brackets 76 which carry the pivot pins 75 are secured to and upon the platform 4 by bolts 83 which pass through registering longitudinal slots 84 in the platform and the flange portions 6a, the length of the slots 84 being such as to provide for a range of adjustment of the positions of the brackets sufficient for taking up, from time to time, the slack of the belts 56 due to continued use and wear. For the purpose of such adjustment a longitudinally extending screw stem 85 is carried by each bracket 76 and passes through an opening in a lug 86 mounted upon the platform 4. The screw stem 85 carries nuts 87 at each side of the lug 86. When the positions of the brackets 76 are to be adjusted to take up slack in the belts 56 the nuts of the fastenings 83 are backed off and the nuts 87 are also backed off. One of the nuts 87 may be conveniently used as a feed nut to effect the longitudinal movement of the stem 85, such movement causing a corresponding movement of the bracket 76. When the brackets 76 have been thus adjusted to the desired positions, all the nuts are tightened, thereby to secure the brackets against displacement.

All of the belts which are used for transmitting power from one element to another are preferably continuous solid belts of V-type. The substitution of a new belt for a worn belt 53 involves merely the movement of the motor 15, by means of its adjustable mounting, to a position in which the worn belt 53 can be disengaged from the sheaves 51 and 52; when this has been done the new belt is substituted and the motor moved back to a position in which the new belt will be under proper tension. In like manner the substitution of new belts for worn belts 56 involves merely such adjustment of the positions of the brackets 76 as will enable the belts 56 to be disengaged from the sheaves 54 and 55 whereupon the new belts are substituted and the brackets 76 are moved back to positions in which the new belts will be under proper working tension.

When a new belt is to be substituted for a worn belt 49 the hanger 57 is disconnected from the platform 4 and from the brackets 22, the two sections of the sheave 48 are disconnected and removed from between the brackets 22, the belt is pulled between the adjacent ends of the reel carrying shafts through the opening 50 in the platform 4 and the shaft 14 is lifted from its supporting brackets 38 whereupon the worn belt is removed by pulling it over one end of the shaft 14 and a new belt is substituted, the new belt being introduced through the opening 50 and passed between the adjacent ends of the reel carrying shafts. The sheave 48 is then re-assembled, the new belt is engaged with the sheaves 47 and 48, the shaft 14 is placed upon its supporting uprights 38, the hanger 57 is connected to the platform 4 and to the brackets 22 and the elevation of the shaft 14 relatively to its supporting uprights is adjusted in the manner previously described in order to place the new belt 49 under proper tension.

The mower is guided over the ground by the handle arms 79 in the same manner as any ordinary hand pushed mower, its turning movements being about points located between the traction wheels 13. Such turning movements are effected with substantially the same ease as the turning movements of an ordinary hand pushed mower, the recess 24c in the pony roll 24 so reducing the contact area of the pony roll with the ground as substantially to aid the easy turning movements of the mower.

I claim:

1. A power driven lawn mower comprising a pair of cutting reels in transverse tandem relation and a shear blade operatively associated therewith, each reel having laterally inclined blades and being of frusto-conical form, shafts upon which the respective reels are mounted, the shafts being coaxial of their respective reels and having opposite inclinations in a vertical plane such that the blades in their lower positions will cooperate with said shear blade to generate a continuous straight horizontal shear line and in their upper positions will have their adjacent ends substantially spaced, a common driving sheave for and located between the reel carrying shafts, universal joint means connecting the sheave at each side thereof to the respective shafts, a transverse driving shaft located substantially vertically above the reels, a sheave upon the driving shaft vertically coplanar with the common driving sheave, and a belt connecting the sheaves and extending through the space between the blades in their upper positions.

2. A lawn mower as set forth in claim 1 wherein the universal joint means includes driving pins and the common driving sheave is composed of opposing half sections connected together by fastenings having bolt elements which constitute the driving pins.

VERNON J. DAVIS.

REFERENCES CITED

The following references are of record in the file of this patent:

UNITED STATES PATENTS

| Number | Name | Date |
| --- | --- | --- |
| 519,860 | Graham | May 15, 1894 |
| 891,867 | Secrest | June 20, 1908 |
| 943,857 | Benson | Dec. 21, 1909 |
| 1,762,287 | Blair | June 10, 1930 |
| 1,778,219 | Kuhlman | Oct. 14, 1930 |
| 2,256,531 | Squires | Sept. 23, 1941 |
| 2,256,583 | Squires | Sept. 23, 1941 |
| 2,282,837 | Wahrenbrock | May 12, 1942 |
| 2,303,055 | Lardi | Nov. 24, 1942 |
| 2,365,338 | Godwin | Dec. 19, 1944 |
| 2,414,077 | Wells | Jan. 7, 1947 |